F. D. MANNING.
DEHORNING CHUTE.
APPLICATION FILED MAY 3, 1917.
1,271,343.
Patented July 2, 1918.
3 SHEETS—SHEET 3.
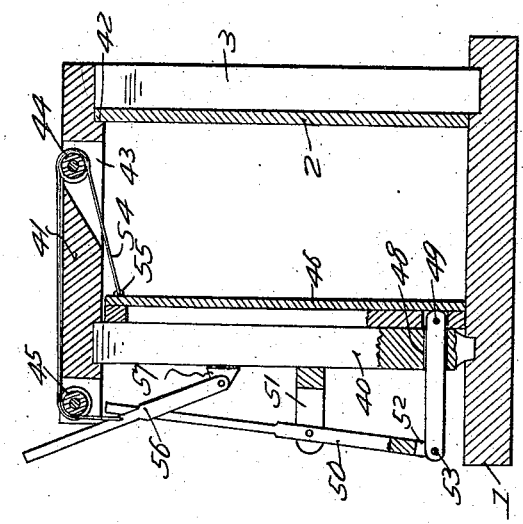
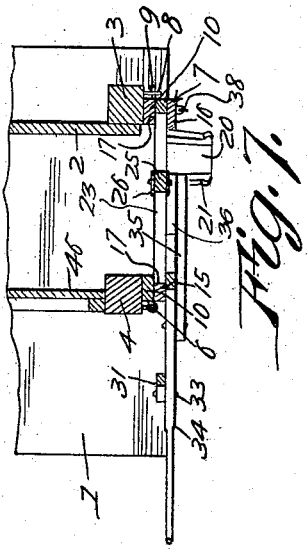
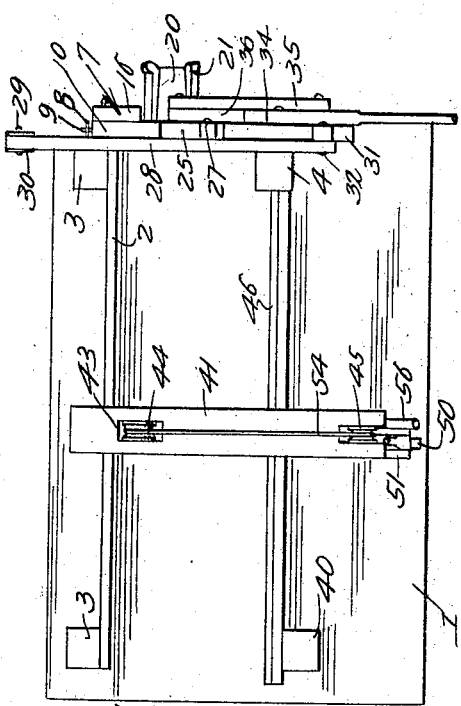
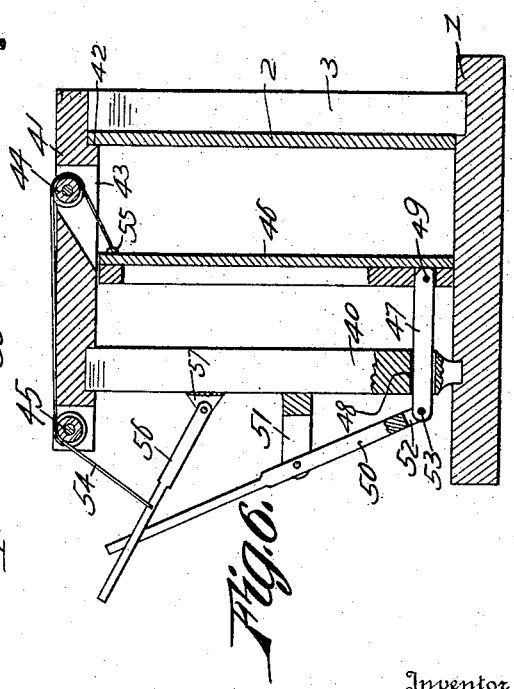
Inventor
Flavian D. Manning,
By Talbert & Parker
Attorneys

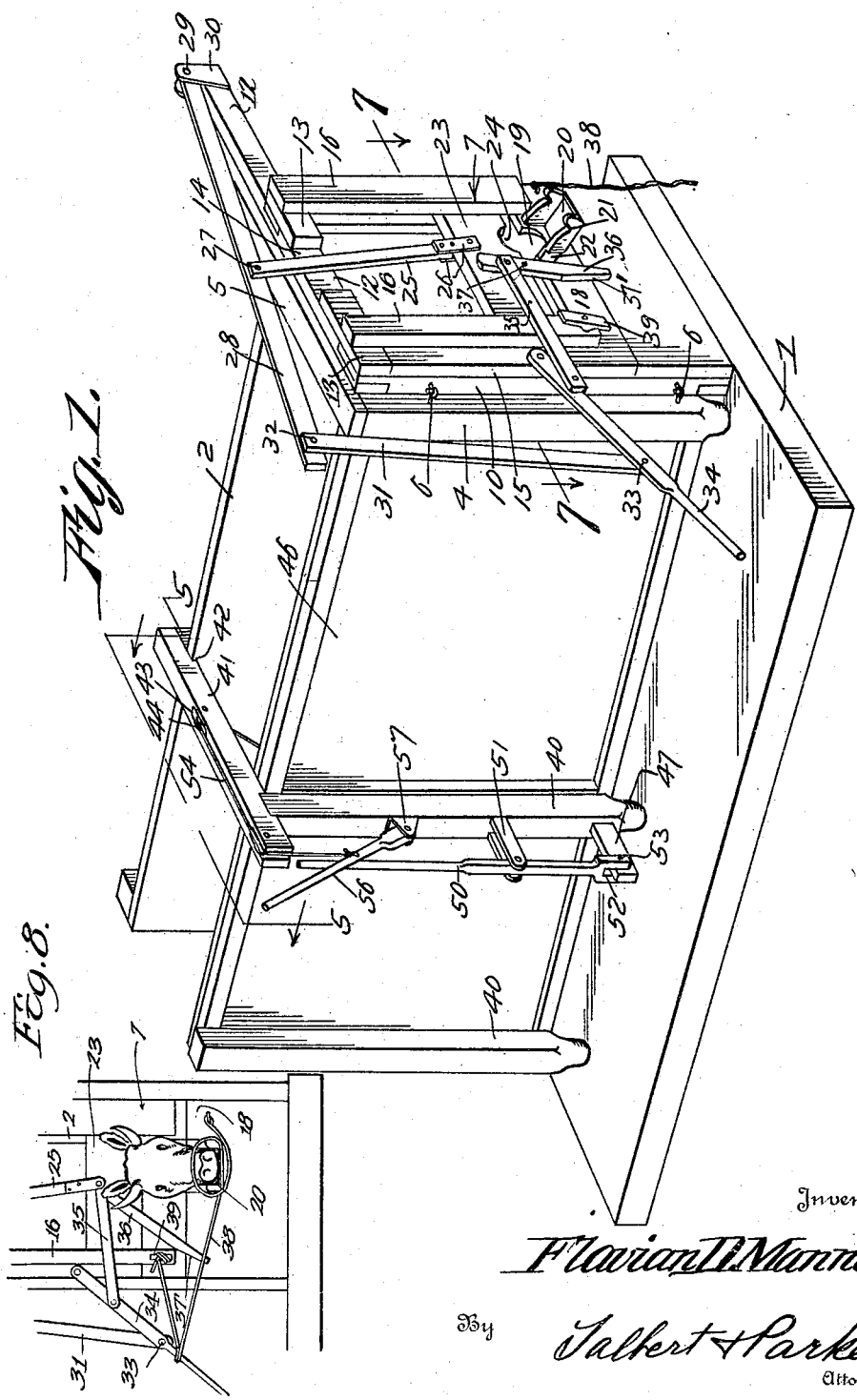

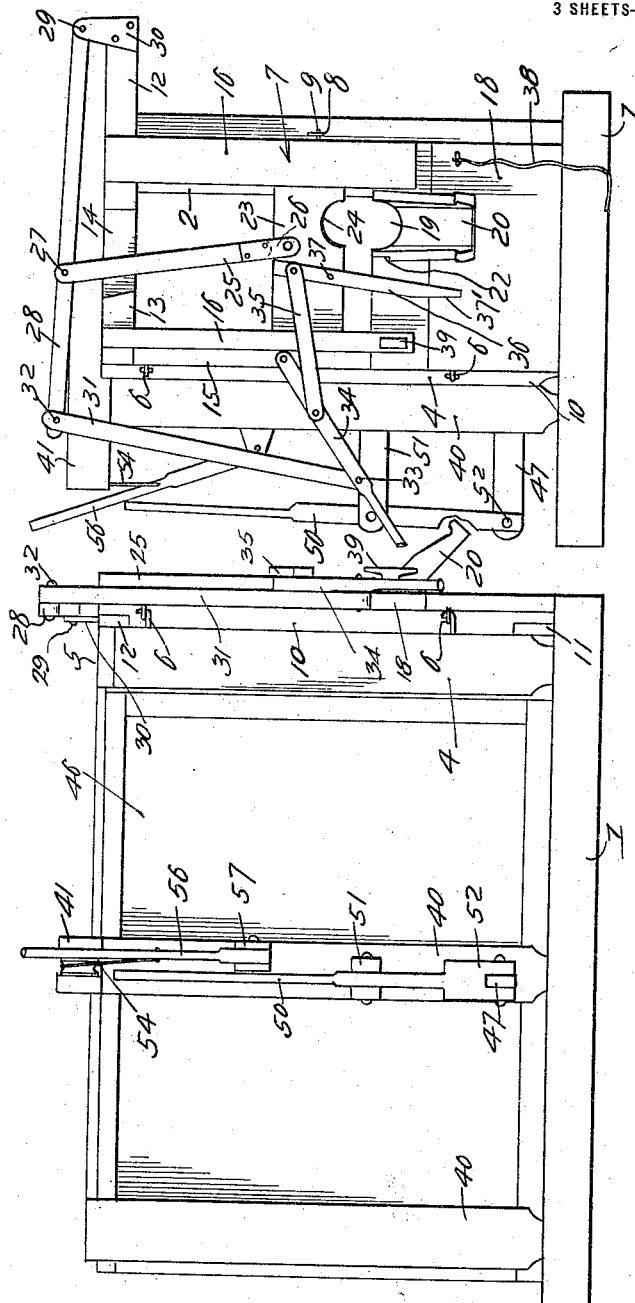

UNITED STATES PATENT OFFICE.

FLAVIAN D. MANNING, OF PERRYVILLE, MISSOURI.

DEHORNING-CHUTE.

1,271,343.  Specification of Letters Patent.  Patented July 2, 1918.

Application filed May 3, 1917. Serial No. 166,232.

*To all whom it may concern:*

Be it known that I, FLAVIAN D. MANNING, a citizen of the United States, residing at Perryville, in the county of Perry and State of Missouri, have invented certain useful Improvements in Dehorning-Chutes, of which the following is a specification, reference being had therein to the accompanying drawing.

The present invention has reference generally to veterinary devices and more particularly relates to a dehorning chute for cattle and the like.

As the primary aim and object the present invention resides in the provision of a dehorning chute embodying novel means for clamping the neck of an animal in a stationary position whereby an attendant may safely and expeditiously cut the horns of the animal held therebetween.

It is an additional and equally important object of the present invention to provide novel means for clamping the body of an animal that is being dehorned so as to support the animal in a substantially upright position thereby obviating the danger of injuring or crippling the stock and permitting of rapid dehorning of several stock in a minimum time.

More particularly, the present invention embraces the provision of a novel arrangement of levers for actuating the movable neck engaging member and for also actuating novel animal neck guiding means arranged beneath the neck engaging member so that the neck of the animal will be readily engaged by the neck engaging member to consequently increase the efficiency of the operation of the device in general.

As a further improvement the invention consists in the provision of novel means for removably receiving and supporting the jaw of the animal that is being dehorned.

The invention also resides in the provision of novel flexible means engageable with the jaw and adapted to hold the head of the animal on the jaw support and adapted to lock the levers to consequently maintain the movable neck engaging member in a substantially stationary position.

Still further, the invention includes the provision of improved means for actuating the movable body engaging and supporting member at the lower end to consequently prevent movement of the feet of the animal and also the provision of novel means for actuating the upper part of this movable body engaging member whereby to maintain the animal in a substantially upright position so as to prevent the animal from lying down, thus obviating or at least reducing to a minimum the possibility of injuring the animal.

It is a more specific object of the present invention to provide improved supporting means for the door carrying the neck engaging and supporting means as well as the operating means therefor and the body clamping and supporting means.

Among the other aims and objects of this invention may be recited the provision of a device of the character mentioned with a view to compactness, and in which the number of parts are comparatively few, the construction simple, the cost of production low and the efficiency high.

Other objects as well as the nature, characteristic features and scope of this invention will be more readily apparent from the following description taken in connection with the accompanying drawings and pointed out in the claims, forming a part of this specification.

The preferred embodiment of the present invention is clearly illustrated in the accompanying drawings, in which:—

Figure 1 is a perspective of the device embodying this invention.

Fig. 2 is a side elevation thereof.

Fig. 3 is a front end elevation.

Fig. 4 is a top plan view of the invention.

Fig. 5 is a transverse section taken on line 5—5 of Fig. 1, in the direction in which the arrows point showing the movable body clamping and supporting means in a closed position.

Fig. 6 is a transverse section taken on line 5—5 in the direction in which the arrows point showing the body clamping and supporting members in an open position.

Fig. 7 is a transverse section taken on line 7—7 of Fig. 1 in the direction in which the arrows point.

Fig. 8 is a front elevation showing an animal held in the device.

Similar characters of reference are employed in all of the above described views, to indicate corresponding parts.

Referring now, more particularly, to the accompanying drawings, there is provided a main supporting base 1 on which is rigidly mounted longitudinally thereof and adjacent one edge, a vertical wall or stationary animal supporting member 2 the purpose of which will presently appear, the wall or member 2 being maintained and braced in its vertical position by a plurality of standards 3.

With a view toward providing the improved animal neck engaging and supporting means another standard 4 is mounted on the base and in spaced relation to one of the end standards 3 being connected at their upper ends by means of a transverse beam 5 which together with the standards 3 and 4 constitute a substantial door jamb. The standard 4 has pivotally connected thereto for horizontal swinging movement by means of suitable hinges 6, a door indicated in its entirety by the numeral 7 and held in a position to removably close the jamb by suitable retaining means such as a hasp 8 pivoted to the end standard 3 and removably engageable with the retaining pin 9 which projects from the door. The frame of the door preferably consists of spaced side bars 10 connected at their upper and lower ends by cross bars 11 and 12, the upper of which is extended beyond the stationary supporting member 2 when the door is in a closed position for a purpose that will presently appear. A sectional cross bar 13 is carried by the outer face of the upper cross bar and extends across the width of the door, the sections being spaced to form a recess 14 also for a purpose that will presently appear. Guide bars 15 are now rigidly connected to the upper portions of the side bars 7 on the front face thereof while other guide bars 16 are rigidly mounted on the front faces of the guide bars 15 and the cross bar 13 and coöperate with the guide bars and cross bar to form opposed vertical grooves 17 in the door. A stationary animal neck supporting member 18 is now mounted on the front face of the door between the side bars 7 and the lower portions of the guide bars 15 extending transversely across the frame of the door and having the upper surface thereof provided with an animal neck receiving recess 19 positioned adjacent the outer edge of the door. Extending downwardly at an incline from the outer face of the member 18 adjacent the recess 19 is a channeled support 20 for removably receiving and supporting the jaws of the animal being dehorned, the upper edges adjacent the outer ends of the sides having notches 21 therein and likewise one side of the support is provided with a vertical groove 22. A movable neck engaging member 23 is now mounted for vertical sliding movement in the grooves 17 and is provided on its lower edge with a neck engaging recess 24 which when the member is in a lowered position registers with the recess 19 to form a neck receiving opening. In order to actuate the movable neck engaging member, a rod 25 has its lower end rounded and pivoted to the upper edge of the member 23 by means of brackets 26 being capable of having a slight rocking movement with respect to the member. The upper end of the rod is arranged in the recess 14 and terminates slightly above the cross bar 12 being fulcrumed as at 27 to a lever 28 one end of which is pivoted as at 29 between opposed brackets 30 carried by the outer projecting end of the cross bar 12 which portion serves in effect as a supporting arm for the bracket. A link 31 has its upper end pivoted as at 32 to the outer end of the lever 28 while the opposite end of the link 31 is pivoted as at 33 substantially intermediate the ends of a manually operable hand lever 34. This hand operable lever 34 has its inner end pivoted to one of the guide bars 15 as indicated. An elongated link 35 has one end pivoted to the lever 34 adjacent its pivot point and the opposite end thereof pivoted to the upper end of animal neck guiding lever 36 which is in turn pivoted as at 37 to the outer face of the member 23 adjacent the lower edge thereof while the free end of the lever 36 is preferably beveled as at 37' so that when the movable neck engaging member 23 is swung upwardly to abut the sectional cross bar 13 upon the raising of the main actuating lever 34, the link 35 is pushed to the right which moves the upper end of the lever 36 in a corresponding direction so that the outer beveled end 37' will abut the adjacent guide bar 16 at a point substantially intermediate the ends thereof and assist in limiting upward movement of the members. When in this position, the opening between the two members is particularly clear with the exception of the lever 36 which is arranged diagonally across the opening near the upper left hand corner. Upon downward swinging movement of the main actuating lever 34 the link 35 is drawn slightly inwardly so as to insure the movement of the lever 36 toward the right hand side of the opening while the neck engaging member is being moved downwardly. Upon continued downward movement the outer end of the lever 36 will pass through the groove 22 so as to insure of the recesses in the neck engaging member being positioned about the neck of the animal which is to be dehorned. As the main actuating lever 34 is swung downwardly beyond its pivot the link 36 is again moved toward the right which swings the upper portion of the lever 36 in a corresponding direction and assures of the beveled edge 37' contacting with the corresponding lower edge of the adjacent guide bar 16.

As intimated, suitable means have been provided for holding the head and jaws of the animal to be dehorned on the support and to also lock the actuating lever 34. In the present instance this means consists of a flexible element such as a cable 38 one end of which is rigidly connected to the member 18 adjacent the outer edge, the cable being adapted to be wrapped about the support 20 to engage the notches 21 and also engage the jaws of the animal so as to prevent movement thereof, the cable being extended across to engage the hand lever 34 and thence extended and wrapped about the keeper 39.

For the purpose of clamping the body of the animal being dehorned in a substantially upright position to reduce to a minimum the possibility of injuring the animal during the act of dehorning there is provided improved clamping and supporting means. As intimated, a vertical wall constitutes a stationary animal body support. Mounted in spaced parallel relation to the other standards 3 and in spaced relation to each other are standards 40, one of which is connected to the adjacent standard 3 by a transverse beam 41, said beam being provided at its reduced end with a shoulder 42 to facilitate the securing of the member 2 adjacent the standard 3 and is further provided with an opening 43 in which is mounted pulley wheel 44 for a purpose that will presently appear and likewise the outer projecting end is bifurcated and has another pulley wheel 45 rotatably mounted therein. Cooperating with the stationary wheel and animal body supporting member 2 is the movable animal body support 46. A link 47 is slidably mounted in an opening 48 and has its inner end pivoted as at 49 to the support 46 adjacent the lower portion at a point substantially intermediate the ends. The manually actuatable lever 50 is pivoted in a suitable bracket 51 carried by the outer face of one of the standards 40 while the outer end is enlarged and bifurcated as at 52 and arranged about the opposite end of the link 47 being pivoted thereto by means of a suitable fastening device 53. Obviously, by engaging the handle portion of the lever 50 the lower portion of the movable support 46 will be consequently swung into close relation with the stationary support 2 to hold the legs and feet of the animal so as to prevent them from moving any material extent. A flexible element such as a chain 54 has one end rigidly connected as at 55 with the upper portion of the movable support 46 at a point substantially intermediate the ends and is trained respectively about the pulley wheels 44 and 45, the opposite end being engaged on a manually operable lever 56 pivotally mounted on a bracket 57 carried by the outer face of one standard 40 into one side of and above the bracket 51. This lever also is designed to swing vertically and by moving the same forwardly the upper portion of the support 46 will be moved toward the support 2 to clamp the upper part of the body of the animal and maintain the animal in a substantially vertical position during the act of dehorning.

The mode of operation of the present invention may be reviewed as follows:

Assuming that the parts have been assembled in the manner described the frame of the door 7 is swung to a closed position and latched by the hasp 8. An animal is now driven into the space between the animal body clamping and supporting members and its head arranged through the opening between the grooves and the neck engaging members, the movable neck engaging member being limited in its upward movement by the cross bar 13. The handle lever 34 is now pulled downwardly and because of the connection of the link 31 with the lever 28 the movable neck engaging member is consequently moved downwardly so that the recess 24 registers with the recess 19 forming an opening in which is held the neck of the animal that is to be dehorned. During the downward swinging movement of the lever 34 the animal head guiding lever 36 is swung transversely across the frame of the door so as to position the neck of the animal directly beneath the opening and facilitate the engagement of the movable neck engaging member with the neck of the animal. The cable 38 is now arranged about the jaws of the animal and the support 20 therefor so as to hold the head of the animal in a substantially stationary position. Incidentally the cable is extended to engage the handle portion of the lever 34 and next engaged in the keeper 39 to consequently substantially lock the lever arrangement and prevent accidental movement of the movable neck engaging member 23. It may be mentioned that swinging movement of this member 23 is prevented by the guide bars 15 while transverse movement thereof is prevented by the guide bars 16 which coöperate with the side bars 7 in providing the grooves 17. The neck of the animal being thus clamped, it is only necessary to swing the manually operable lever 50 downwardly and away from the standard so as to move the lower portion of the movable support 46 into close relation with the stationary support or wall 2 and prevent the feet of the animal from moving. Finally the lever 56 is moved downwardly about the pivot to consequently exert a pull on the cable and move the upper member of the movable support 46 toward the stationary support 2 and thereby hold the body in a substantially upright position.

It is believed from the foregoing description that the nature and advantages of this invention will be readily apparent. However, it may be mentioned that the device is equally well adapted for holding animals for placing tags in the ears thereof, for marking the ears or for accomplishing other similar purposes where it is necessary that the animal be prevented from moving.

It will be understood that the foregoing description and accompanying drawings comprehend only the general and preferred embodiment of this invention and that various minor changes in detail of construction, proportion, and arrangement of the parts may be made within the scope of the appended claims, without sacrificing any of the advantages of this invention.

Having thus fully described this invention, what is claimed is:

1. A device of the character described including a main support, cooperating animal neck engaging and supporting members mounted on the support one of which is movable vertically relative to the other, operating means on the support and connected to the movable member for raising and lowering the movable member, a lever movably mounted on the movable member and operably connected to and operable with the operating means for guiding the neck of an animal so as to properly position the same between the members, and means for clamping and supporting the body of an animal being dehorned in an upright position during the act of dehorning.

2. A device of the character described including a supporting base, a door jamb mounted thereon, a door swingingly connected to the door jamb, means for removably holding the door in a closed position, cooperative animal neck engaging and supporting members mounted on the frame of the door one of which members is movable relative to the other, means mounted on the door for raising and lowering the movable member, an animal jaw receiving support carried by the stationary neck receiving member, flexible means connected to the frame of the door and adapted for engagement with the jaws of the animal being dehorned and the jaw support and also engageable with the actuating means to removably hold the same in a substantially locked position, and means mounted on the base for clamping and supporting the body of the animal being dehorned to prevent movement of the animal during the act of dehorning.

3. A device of the character described including a supporting base, a door jamb mounted thereon, a door swingingly connected to the jamb, means for removably holding the door in a closed position, a stationary animal neck receiving member carried by the frame of the door, a movable animal neck engaging member mounted on the frame of the door and coöperating with the stationary member, a plurality of levers mounted on the frame of the door and operably connected to the movable member for actuating the member, another lever operably mounted on the movable member and operably connected to one of the first mentioned levers for guiding the neck of the animal during the actuation of the movable member to permit of a proper engagement of the movable member with the neck of the animal, and means mounted on the base adjacent the door frame for clamping and supporting the body of the animal being dehorned in an upright position during the dehorning operation.

4. A device of the character described including a supporting base, a door jamb mounted thereon, a door swingingly connected to the jamb, a stationary animal neck receiving and supporting member carried by the frame of the door, a vertically movable animal neck engaging member mounted in the frame of the door, means for guiding a vertical sliding movement of the movable member, a plurality of levers operably connected to the frame of the door and to the movable member for actuating the movable member, another lever operably mounted on the movable member and operably connected to one of the first mentioned levers for guiding the neck of the animal which is to be dehorned during the actuation of the movable member to permit the movable member to properly engage the neck of the animal, a support carried by the outer face of the stationary neck supporting member for receiving and supporting the jaw and head of the animal being dehorned, flexible means connected to the stationary member for holding the head of the animal being dehorned on the support therefor and engageable with one of the movable member actuating levers to prevent accidental movement of the movable member, and means mounted on the support for clamping and supporting the body of an animal in an upright position during the act of dehorning.

5. A device of the character described including a supporting base, a door jamb mounted thereon, a door swingingly connected to the jamb, a stationary member mounted on the lower portion of the frame of the door and transversely thereof and having an animal neck receiving recess therein, a movable member mounted for vertical sliding movement in the door frame above the stationary member and having a neck engaging recess adapted for alinement with the other recess to form an opening, a rod movably connected to the upper end of the movable member, a lever pivotally connected to the top of the frame of the door and having the rod fulcrumed thereto, a link pivoted to the outer end of the lever, a handle lever fulcrumed to the frame of the door and having the link pivoted thereto, an animal neck guiding lever pivoted to the movable member, a link operably connecting the animal neck guiding lever and the handle lever whereby when the handle lever is actuated to lower the movable member the animal neck guiding lever will direct the neck of an animal in a position to be engaged by the recesses in the stationary and movable members, and means mounted on the base for holding the body of an animal being dehorned in a stationary position during the dehorning operation.

6. A device of the character described including a supporting base, animal neck engaging and supporting means thereon, a stationary animal body support mounted on the supporting base, a movable animal body support shiftable on the base and coöperating with the stationary support, a slidably mounted link pivoted to the lower portion of the movable support, a pivotally mounted lever pivoted to the link for shifting the lower portion of the movable support toward the stationary support so as to clamp the hoofs of the animal being dehorned, and manually actuatable means operably connected to the upper portion of the movable support for moving the upper portion of the movable support toward the stationary support so as to clamp the body of the animal in a substantial upright position.

7. A device of the character described including a supporting base, animal neck engaging and supporting means operably mounted on the base, a stationary animal body support mounted on the base, a standard mounted on the base in spaced relation to the stationary support, a beam connected to the standard and to the stationary support, pulley wheels operably mounted in the beam adjacent the respective ends, a movable animal body supporting member mounted on the base and shiftable beneath the beam, a link slidably mounted in the standard and pivotally connected to the lower portion of the movable support, a manually actuatable lever pivot to the standard and operably connected to the sliding link for shifting the lower portion of the movable support to consequently hold the legs and hoofs of the animal against the stationary support, a cable connected to the movable support and trained about the pulley wheels and another manually actuatable lever pivoted on the standard and connected to the outer end of the cable for moving the upper part of the movable support so as to clamp the upper part of the body of an animal in a substantially upright position against the stationary support.

In testimony whereof I affix my signature.

FLAVIAN D. MANNING.

Copies of this patent may be obtained for five cents each, by addressing the "Commissioner of Patents, Washington, D. C."